United States Patent
Zavdi et al.

(10) Patent No.: US 10,785,235 B2
(45) Date of Patent: Sep. 22, 2020

(54) SYSTEM AND METHOD FOR GATHERING BOTNET CYBER INTELLIGENCE

(71) Applicant: NUCLEON LTD., Or Yhuda (IL)

(72) Inventors: Moran Zavdi, Ramat Gan (IL); Yossi Accav, Binyamina (IL); Dina Shomer, Kfar Uriya (IL)

(73) Assignee: NUCLEON LTD., Rehovot (IL)

( * ) Notice: Subject to any disclaimer, the term of this patent is extended or adjusted under 35 U.S.C. 154(b) by 532 days.

(21) Appl. No.: 15/622,386

(22) Filed: Jun. 14, 2017

(65) Prior Publication Data

US 2017/0359360 A1    Dec. 14, 2017

Related U.S. Application Data

(60) Provisional application No. 62/349,688, filed on Jun. 14, 2016.

(51) Int. Cl.
| | |
|---|---|
| *G06F 21/55* | (2013.01) |
| *H04L 29/06* | (2006.01) |
| *G06F 21/57* | (2013.01) |

(52) U.S. Cl.
CPC ........ *H04L 63/1416* (2013.01); *G06F 21/552* (2013.01); *H04L 63/1425* (2013.01); *H04L 63/1433* (2013.01); *G06F 21/554* (2013.01); *G06F 21/577* (2013.01); *G06F 2221/2101* (2013.01); *H04L 63/1466* (2013.01); *H04L 2463/144* (2013.01)

(58) Field of Classification Search
CPC .......... H04L 63/1416; H04L 63/1425; H04L 63/1433; H04L 63/1466; H04L 2463/144; G06F 21/552; G06F 21/577; G06F 21/554; G06F 2221/2101
See application file for complete search history.

(56) References Cited

U.S. PATENT DOCUMENTS

| | | | |
|---|---|---|---|
| 2003/0110396 A1* | 6/2003 | Lewis ................. | H04L 63/0227 726/4 |
| 2010/0050260 A1* | 2/2010 | Nakakoji ............ | H04L 63/0227 726/23 |
| 2010/0067377 A1* | 3/2010 | Wang ................. | H04L 63/1441 370/230 |
| 2013/0174256 A1* | 7/2013 | Powers ............... | H04L 63/1416 726/23 |
| 2014/0215599 A1* | 7/2014 | Demopoulos ........... | G06F 21/55 726/13 |

(Continued)

FOREIGN PATENT DOCUMENTS

CN    103916387 A    *    7/2014    ............ H04L 29/06

*Primary Examiner* — Lynn D Feild
*Assistant Examiner* — Abdullah Alamun
(74) *Attorney, Agent, or Firm* — Browdy and Neimark, P.L.L.C.

(57) ABSTRACT

A drone unit operatively connected to a server may identify an attack, launched by a botnet, on a resource. A drone unit may continuously and iteratively, while the attack is in progress, determine and report to a server a first set of values of a respective set of operational parameters related to the resource. A drone unit may determine, and report to the server, a second set of values of the set of operational parameters after the attack is terminated. A server may determine an impact of an attack by relating the first set values to the second set of values.

18 Claims, 3 Drawing Sheets

(56) References Cited

U.S. PATENT DOCUMENTS

2016/0205134 A1* 7/2016 Smith ................... H04L 63/101
                                                              726/23
2017/0331854 A1* 11/2017 Reddy ................... H04L 9/0861
2018/0046811 A1* 2/2018 Andriani ................ G06F 21/55

* cited by examiner

SYSTEM AND METHOD FOR GATHERING BOTNET CYBER INTELLIGENCE

CROSS REFERENCE TO RELATED APPLICATIONS

This application claims the benefit of U.S. Provisional Patent Application No. 62/349,688, filed on Jun. 14, 2016 and entitled SYSTEM AND METHOD FOR GATHERING BOTNET CYBER INTELLIGENCE, which is incorporated in its entirety herein by reference.

FIELD OF THE INVENTION

The present invention relates generally to handling cyber-threats and cyber-attacks. More specifically, the present invention relates to identifying a cyber-threat and/or an impact of a cyber-attack.

BACKGROUND OF THE INVENTION

Cyber-attacks are known in the art and generally include, or are related to, various offensive systems, methods and operations that target information and infrastructure. Cyber-attacks typically include stealing sensitive information, deleting or modifying information in an attacked system, disabling or otherwise interfering with an operation of a computing system etc. Typically, the source of an attack (or identity of an attacker) is unknown.

Various systems and methods for combating cyber-attacks are known. For example, anti-virus software, firewalls and the like may be employed in order to protect systems against cyber-attacks and/or cyber-threats.

SUMMARY OF THE INVENTION

In some embodiments, a drone unit operatively connected to a server may identify an attack, launched by a botnet, on a resource. A drone unit may continuously, repeatedly and iteratively, while the attack is in progress, determine and report to a server a first set of values of a respective set of operational parameters related to the resource; and determine, and report to the server, a second set of values of the set of operational parameters, the second set determined after the attack is terminated. A server may be adapted to determine an impact of an attack by relating the first set values to the second set of values. A drone unit may be adapted to, while an attack is in progress, repeatedly determine and send values of operational parameters of an attacked resource using a random time interval and, the drone unit may be adapted to, after the attack has terminated, repeatedly determine and send values of the operational parameters for a predefined time period.

A drone unit may be adapted to identify a resource being attacked and provide, to a server, information identifying the resource. A drone unit may be adapted to identify a botnet and provide, to a server, intelligence regarding the botnet. Identifying an attack may include examining and identifying at least one of: data sent to an attacked resource and data sent by the attacked resource.

Operational parameters values, of an attacked resource, collected or calculated by a drone unit and by a server, may include at least one of for example: a response time, a CPU load, opening a communication port response time measure, and network utilization. Operational parameters values may be determined based on a response time of a remotely available service. A response time of an attacked resource may be continuously, repeatedly and/or iteratively, measured according to a randomly selected interval. Determining, and reporting to a server, operational parameters values may continue, for a predetermined time, after an attack has finished.

A plurality of monitoring servers located in a respective plurality of geographic locations may each, for example: continuously, repeatedly and/or iteratively, while the attack is in progress, determine and report to a server a first set of values of a respective set of operational parameters related to the resource; and determine, and report to the server, a second set of values of the set of operational parameters, the second set determined after the attack is terminated.

A server may correlate values of operational parameters with time and present, to a user, a time-based progression of an attack. Values related to a plurality of attacks may be stored and stored values may be used in order to characterize an attack.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
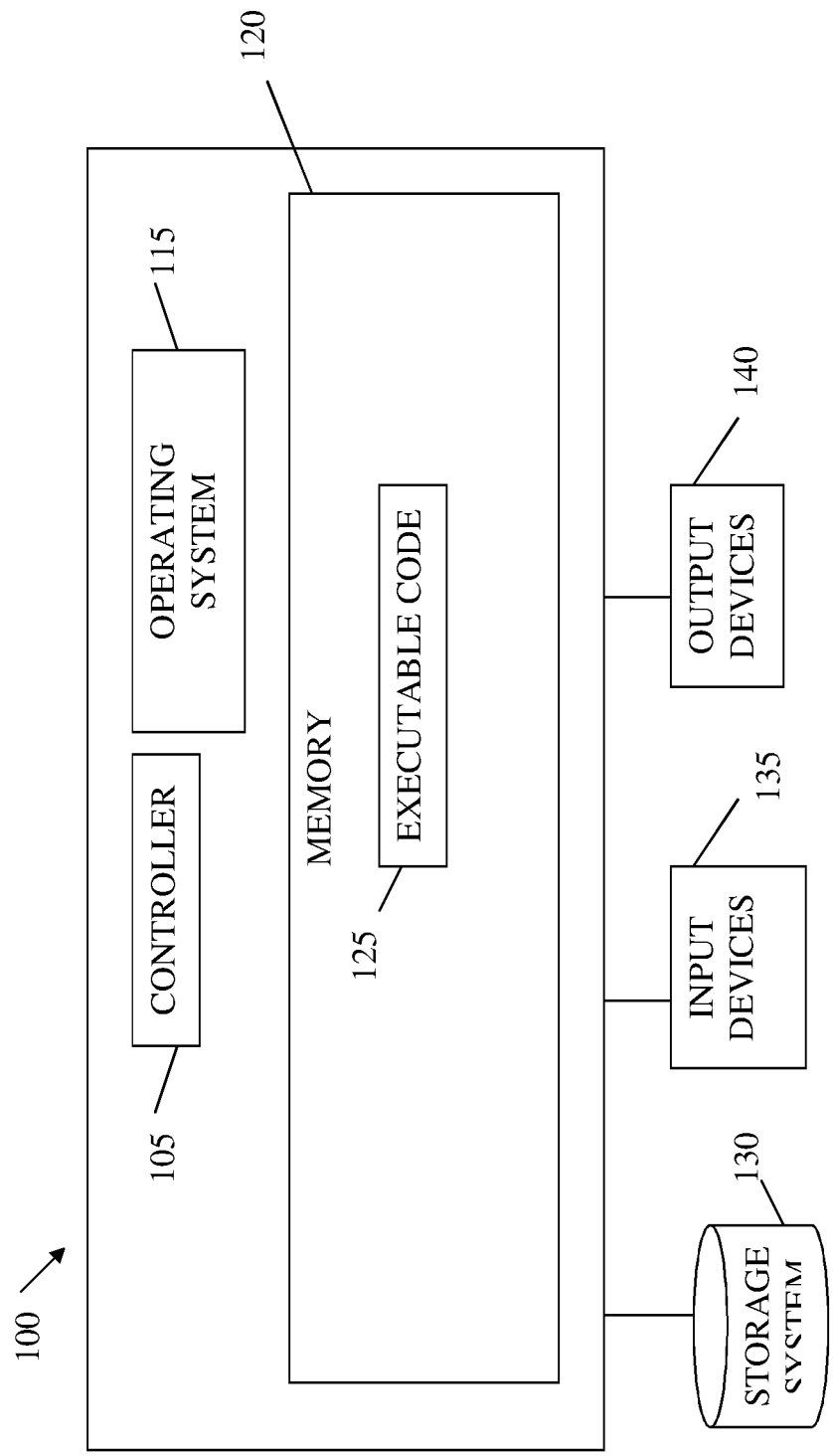
FIG. 1 shows a high level block diagram of an exemplary computing device according to illustrative embodiments of the present invention.

It will be appreciated that, for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining,"

"establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the invention may identify an attack, launched by a botnet, on a resource. A system and method according to some embodiments of the invention may continuously, repeatedly and/or iteratively, or repeatedly, while the attack is in progress, determine and report to a server a first set of values of a respective set of operational parameters related to the resource; and determine, and report to the server, a second set of values of the set of operational parameters, the second set determined after the attack is terminated. A server may be adapted to determine, quantify or otherwise evaluate an impact of an attack by relating the first set values to the second set of values. A drone unit may be adapted to, while an attack is in progress, repeatedly determine and send values of operational parameters of an attacked resource using a random time interval and, the drone unit may be adapted to, after the attack has terminated, repeatedly determine and send values of the operational parameters for a predefined time period.

Figure 2:
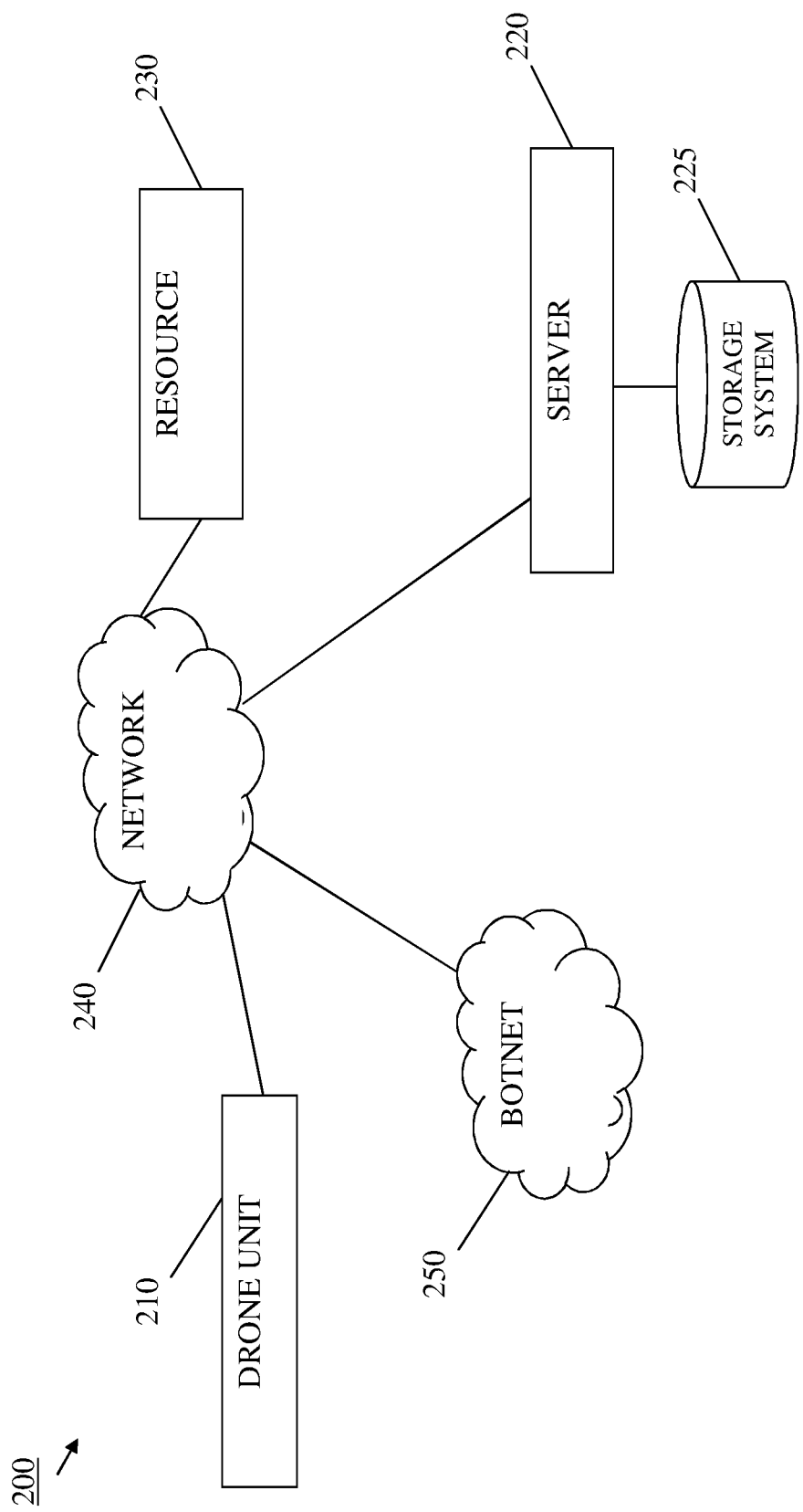
FIG. 2 is an overview of a system according to illustrative embodiments of the present invention.

Reference is made to FIG. 1, which shows a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included, and one or more computing devices 100 may act as the various components, for example more than one drone unit 210 and/or one serve 220 as shown in FIG. 2 may be included in a system according to the invention.

For example, drone unit 210 described herein may be, or may include components of, computing device 100. For example, by executing executable code 125 stored in memory 120, controller 105 (e.g., included in a drone unit 210 described herein) may be configured to carry out a method of determining, quantifying or evaluating an impact of an attack as described herein. For example, as further described herein (e.g., with respect to drone unit 210 that may include a controller 105), controller 105 may be configured to join a botnet (e.g., establish a connection with a control unit of a botnet and receive data and instructions therefrom), identify an attack, launched by the botnet, on a resource, continuously repeatedly and/or iteratively, while the attack is in progress, determine and report to a server, a first set of values of a respective set of operational parameters related to the resource, and, after the attack is terminated, finished or over, determine, and report to the server, a second set of values of the set of operational parameters. A controller 105, e.g., included in server 220 as described herein, may be adapted to determine an impact of an attack by relating or comparing the first set values to the second set of values.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or enabling software programs or other modules or units to communicate. Operating system 115 may be a commercial operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that determines an impact of an attack as further described herein. Although, for the sake of clarity, a single item of executable code 125 is shown in FIG. 1, a system according to some embodiments of the invention may include a plurality of executable code segments similar to executable code 125 that may be loaded into memory 120 and cause controller 105 to carry out methods described herein. For example, units or modules described herein (e.g., drone unit 210) may be, or may include, controller 105, memory 120 and executable code 125.

Storage system 130 may be or may include, for example, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1 may be omitted. For example, memory 120 may be a non-volatile memory having the storage capacity of storage system 130. Accordingly, although shown as a separate component, storage system 130 may be embedded or included in memory 120.

Input devices 135 may be or may include a mouse, a keyboard, a touch screen or pad or any suitable input device. It will be recognized that any suitable number of input devices may be operatively connected to computing device 100 as shown by block 135. Output devices 140 may include one or more displays or monitors, speakers and/or any other suitable output devices. It will be recognized that any suitable number of output devices may be operatively connected to computing device 100 as shown by block 140. Any applicable input/output (I/O) devices may be connected to computing device 100 as shown by blocks 135 and 140. For example, a wired or wireless network interface card (NIC), a printer, a universal serial bus (USB) device or external hard drive may be included in input devices 135 and/or output devices 140.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a personal computer, a desktop computer, a laptop computer, a workstation, a server computer, a network device, or any other suitable computing device. For example, a system as described herein may include one or more devices such as computing device 100.

As described herein, some systems and methods according to some embodiments of the invention may determine an impact of an attack on a resource. Determining an impact of an attack on a resource as referred to herein may include one or more of: evaluating, classifying, quantifying, characterizing, ranking, scoring or rating an attack.

A resource as referred to herein may be any computing related resource, e.g., a server, a website, a database, a cloud service, or a network that includes a plurality of servers, services etc. For example, some embodiments of the invention may determine an impact of an attack on a website (the resource in this case) by determining the decrease of availability (or other functionality) of the website when the website is under attack.

As described herein, some embodiments may store, report and/or provide one or more of: an evaluation, classification, quantity, characteristics, rank, score or rating of an attack. Some systems and methods according to some embodiments of the invention may relate or compare operational parameters' values of a resource measured or determined at different points in time and thus evaluate, classify, quantify, characterize, rank, score or rate an attack.

As known in the art, a response time is an operational parameter (time) value, indicating, or used as a measure of, the time it takes a resource (e.g., a server, service, application or website) to respond to a request (e.g., a time it takes a server to provide a response to a query, establish a network connection, or perform a requested operation). Accordingly, some embodiments may compare, or otherwise relate, a website's response time (an operational parameter value) when the website is under attack, to the website's response time after the attack has ended. Some embodiments may compare, or otherwise relate, a website's response time, as measured before an attack begins, to the website's response time when the website is under the attack. By relating operational parameters' values of a resource as measured when the resource is under attack to the operational parameters' values of the resource after the attack has ended (or before the attack started), embodiments of the invention may characterize or identify an impact of the attack. In some embodiments of the invention, evaluating, characterizing and/or identifying an attack (and/or an impact of an attack) may include any one of: a classification value, a quantity, ranking value, a (severity or other) score value and a rating value.

The term "real-time" (also known in the art as "realtime", or "real time") as referred to herein generally relates to processing or handling of events at the rate or pace that the events occur or received. For example, a system according to some embodiments of the invention may determine an impact of an attack continuously, repeatedly and/or iteratively, and/or and in real-time, e.g., within milliseconds or other very brief periods so that an ongoing measure of an attack, and/or an impact of the attack on a resource, is provided continuously and/or immediately, in real-time, as the attack progresses.

Reference is made to FIG. 2, which shows an overview of a system 200 according to some embodiments of the present invention. As shown, system 200 may include a drone unit 210, a server 220 operatively connected to a storage system 225, a resource 230, a network 240 and a botnet 250. Botnet 250 may be a botnet as known in the art, e.g., a number of computers controlled or managed to launch attacks on resources such as websites and servers. Drone unit 210 may be a computer, a server or other device or system connected to a network. For example, drone unit 210 may be a portable or personal computer (PC) as known in the art, or it may be a server. Server 220 may be a server as known in the art, e.g., a computer that includes one or more network interfaces a storage system and a powerful set of CPU's. It will be noted that drone unit 210, server 220 and resource 230 may be located at different geographical locations and need not be physically close. It will further be understood that the scope of the invention is not limited by the type of devices used for implementing drone unit 210 and server 220 who may be any suitable computing device, unit or module.

Network 240 may enable drone unit 210, server 220 storage system 225, resource 230, and botnet 250 to communicate. For example, network 240 may be, or may be included in, the Internet. In some embodiments, network 240 may be, may comprise or may be part of a private or public internet protocol (IP) network, or the internet, or a combination thereof. Additionally or alternatively, network 240 may be, comprise or be part of a global system for mobile communications (GSM) network. For example, network 240 may include or comprise an IP network such as the internet, a GSM related network and any equipment for bridging or otherwise connecting such networks as known in the art. In addition, network 240 may be, may comprise or be part of an integrated services digital network (ISDN), a public switched telephone network (PSTN), a public or private data network, a local area network (LAN), a metropolitan area network (MAN), a wide area network (WAN), a wireline or wireless network, a local, regional, or global communication network, a satellite communication network, a cellular communication network, any combination of the preceding and/or any other suitable communication means. Accordingly, numerous elements of network 240 are implied but not shown, e.g., access points, base stations, communication satellites, GPS satellites, routers, telephone switches, etc. It will be recognized that embodiments of the invention are not limited by the nature of network 240.

Drone unit 210 may be any suitable unit, module or device. A drone unit may be a computing device connected to a network and adapted to receive data from a botnet. A drone unit may provide a server with information related to a botnet and to an activity of a botnet, e.g., inform a server that a botnet has launched an attack on a resource. A drone unit may be any suitable device or system capable of receiving information from a botnet and providing data and information to a server. For example, a drone unit may be a computer as known in the art. For example, drone unit may be, or may include components of, computing device 100, e.g., a controller 105, executable code 125 and a memory 120. For example, when executed by a controller 105 included in drone unit 210, executable code 125 may cause controller 105 to join botnet 250, identify an attack launched by botnet 250, continuously repeatedly and/or iteratively, while an attack, launched by botnet 250 on resource 230, is in progress, determine, and report to server 220, values of operational parameters related to resource 230, determine or identify the attack has ended or terminated, and, determine, and report to server 220, values of operational parameters related to resource 230, after the attack is over. Drone unit 210 may be any suitable unit, module or device connected to a network and adapted to join a botnet as described herein. Joining a botnet as referred to herein may include any operation that may be performed in order to cause a manager of a botnet (that may be a computer, an application or even a human) to treat the joining entity (e.g., drone unit 210) as if it were a member or part of the botnet. As known in the art, a botnet comprises or includes a (typically large) number of computers that are caused and/or coordinated to launch attacks, and, accordingly, joining a botnet may include becoming a member as described. For example, to join a botnet, drone unit 210 may authenticate itself with a controller or manager of a botnet (e.g., using credentials provide by server 220), in other cases, drone unit 210 may join, or become a member or part of a botnet by establishing a connection with a member of the botnet (e.g., with a server that controls the botnet) and may use the established connection in order to receive any messages exchanged over the botnet. Graphically described, drone unit 210 may act as a mole or spy that taps into data exchanged over a botnet by joining the botnet.

Drone unit 210 may be any suitable unit, module or device that can, based on information received from a botnet, detect, determine or identify that an attack, launched by a botnet, has begun or is in progress. For example, drone unit 210 may be a computer connected to network 240, a module in a server or a computing device similar to computing device 100 as described herein. In a preferred embodiment, drone unit 210 is a unit or device that is deployed in a chosen geographical location. For example, in some embodiments, a (possibly large) number of drone units 210 are deployed in a number of places, countries or continents and one or more serves 220 may manage, or communicate with, the number or set of drone units 210, e.g., one or more servers 220 may provide drone units 210 with configuration parameters and receive data from drone units 210 as described herein.

Although a single drone unit 210 and a single server 220 are shown in FIG. 2, other embodiments and configurations may be contemplated. For example, a system may include any number of drone units similar to drone unit 210 and one or more servers similar to server 220 may communicate and collaborate with a plurality of drone units 210. In some embodiments, a plurality of drone units 210 may be included in a single device. In some embodiments, one or more drone units 210 may be included in server 220. It will, therefore, be understood that the scope of the invention is note limited by the number or type of drone units 210 and servers 220 described herein.

Botnet 250 may be a botnet (and/or a controlling entity and one or more zombie computers) as known in the art. Generally, a botnet is a number of computers, connected to a network such as the internet, and controlled such that they coordinate their actions which are typically malicious, e.g., launch denial-of-service (DOS) or distributed DOS (DDoS) attacks (e.g., see https://en.wikipedia.org/wiki/Botnet).

Resource 230 may be any resource that may be attacked, for example, resource 230 may be a service or server (e.g., a Domain Name System (DNS) server or service, a Lightweight Directory Access Protocol (LDAP) server or service etc.). In other cases, resource 230 may be a website (or a server supporting a website as known in the art). Generally, resource 230 may be any resource, machine, service or application that may be attacked by botnet 250. Although a single resource 230 is shown in FIG. 2, it will be understood that a system and method according to the invention may include, be connected with, or work with, any number of resources similar to resource 230. For example, any number of resources similar to resource 230 may be connected to network 240 and a system (e.g., drone unit 210 and server 220) may determine an impact of an attack on any number of resources on network 240, either simultaneously (e.g., simultaneously determine impacts of a number of attacks on a number of resources) or sequentially (e.g., determine an impact of an attack on a first resource and then, at a later stage, determine an impact of an attack on a second resource). A method of determining an impact of an attack according to some embodiments of the invention may be carried out or performed continuously repeatedly and/or iteratively, e.g., drone unit 210 may continuously, repeatedly and/or iteratively identify an attack as described, collect operational values of an attacked resource, and server 220 may continuously, repeatedly and/or iteratively, use data received from drone unit 210 in order to determine an impact of an attack as described.

Server 220 may be a server or computer as known in the art. In some embodiments, server 220 may be, or may include components of, computing device 100, e.g., a controller 105, executable code 125 and a memory 120. For example, when executed by a controller 105 included in server 220, executable code 125 may cause controller 105 to receive, from drone unit 210, values of operational parameters related to resource 230 (obtained while resource 230 is attacked by botnet 250) and determine an impact of the attack by relating the received values to values stored in storage system 225. In some embodiments, server 220 may (e.g., using a controller 105) receive one or more values of a respective one or more operational parameters of resource 230, obtained while resource 230 is under attack, receive values of the one or more operational parameters after the attack ends and use the received values to determine an impact of the attack. As described, evaluating an attack or determining an effect or impact of the attack may be done while the attack is in progress. For example, assuming resource 230 is a website (e.g., a computer that executes or provides Internet Information Services (IIS) as known in the art) and assuming an attack on resource 230 starts at time 00:00:00 (where HH:MM:SS denotes hours, minutes and seconds), drone unit 210 may continuously, repeatedly and/or iteratively provide server 220 with measured response times of the website, e.g. at 00:00:10, 00:00:20, 00:00:30 and so on. Measuring a response time may be done as known in the art, e.g., measuring the time between sending a request (e.g., to receive a webpage) and receiving a response (receiving the webpage). In other cases, measuring a response time may include measuring the time it takes to establish a network connection, e.g., the time between sending a "SYN" packet and receiving the "SYN-ACK" packet when opening a Transmission Control Protocol (TCP) connection as known in the art. Using a set of, possibly continuous, operational values such as the response times in the current example, server 220 may (possibly continuously, periodically, repeatedly and/or iteratively) calculate, in real-time, an impact of an attack, possibly as the attack progress.

Server 220 may present any information to a user. For example, an impact of an attack may be presented, on a monitor connected to server 220, as numeric data, textual data and/or graphical data. For example, an impact of an attack may be presented as a decrease (e.g., in percentage or absolute values) in performance. For example, a trend along a timeline of response times of a website while under attack and after (or before) the attack may be presented. An impact of an attack may be continuously, repeatedly and/or iteratively, and in real-time, presented, by server 220, e.g., in the form of a timeline trend, curve or graph. In some embodiments, a table or chart that may be continuously, repeatedly, iteratively or periodically updated may provide real-time representation of an impact of an attack. For example, based on a continuous set of operational values provided by drone unit 210, in real-time, while an attack is in progress, server 220 may determine the impact of the attack and present the impact to a user, e.g., using a dynamic graph or curve or by continuously presenting data as it is being calculated.

Storage system 225 may be any suitable storage system as known in the art. For example, storage system 225 may be an array of disks, a network storage system and the like. Storage system 225 may be, or may include any components of, storage system 130. Storage system 225 may include, or be used for storing, information related to botnets, resources and attacks. For example, information or metadata characterizing an attack such as a protocol used by a botnet during an attack (e.g., the attack is using TCP to open many ports, file transfer protocol (FTP) to download large files etc.), internet protocol (IP) addresses of computers participating in an attack, time of an attack and the like may be stored in storage system 225. Data stored in storage system 225 may include information related to a resource. For example, operational values (e.g., a response time) of a resource may be stored in storage system 225 and, when server 220 receives operational values of an attacked resource, server 220 may find, in storage system 225, operational values of the resource as measured during regular operation (e.g., during a time the resource is not under attack). Accordingly, immediately upon receiving operational values of an attacked resource, server 220 may provide a measure or indication of the impact of the attack.

As described herein, in some embodiments, a method of evaluating an impact of an attack, e.g., carried out by system 200 as described herein, may include causing a drone unit to receive messages sent by a botnet and determine an attack on a resource is launched by the botnet, based on at least one of the messages. A method may further include measuring, by a drone unit the time required for the resource to complete a task while the resource is under attack and reporting the time measured to a server.

A method may further include measuring, by a drone unit the time required for the resource to complete a task after the attack is over and reporting the time measured to a server. A method may further include determining, by the server, an impact of the attack by comparing the time required for the resource to complete the task while the resource is under attack to the time required for the resource to complete the task after the attack is over. For example, by joining botnet 250 as described herein, drone unit 210 may receive messages sent over, or by, botnet 250 and may determine an attack on a resource 230 is about to begin or is under way. Having determined resource 230 is under attack, drone unit 210 may measure the time required for, or by, resource 230, to complete a task, e.g., a task of establishing a network connection, responding to a query and/or any other task or operation. Based on messages received from botnet 250, drone unit 210 may determine or identify that the attack is over, e.g., based on a message that instructs components of botnet 250 to stop attacking resource 230. Having determined an attack is over, drone unit 210 may measure (again) the time required for, or by, resource 230, to complete the task, e.g., complete the same task for which time was measured when resource 230 was under the attack. Accordingly, times for completing a task when under attack and when in normal state or condition (namely, when not under an attack) may be obtained by a system and method according to embodiments of the invention. The times measured as described may be provided to a server (e.g., server 220) and the server may determine the impact of the attack based on these times. For example, by dividing the time needed or required, by resource 230, to complete a task when under attack by the time needed or required, by resource 230, to complete the same task after the attack is over, an impact of the attack may be quantified. For example, if resource 230 establishes a network connection, when under attack takes, in 120 milliseconds and establishes a network connection, after the attack is over or terminated, in 70 milliseconds, then the impact of the attack may be represented or quantified by 120/70=1.71. In another case, e.g., when a different, more sever attack is launched on resource 230, the time to establish a network connection required by resource 230 may be 235 milliseconds, and, therefore, the impact of the second attack may be represented or quantified by 235/70=3.35. Accordingly, by dividing the time measured while the attack is under way by the time measured after the attack, the impact of the attack may be quantified, evaluated or represented. Other way of relating or comparing times measured as described may be used in order to quantify, evaluate or represent an impact of an attack.

Figure 3:
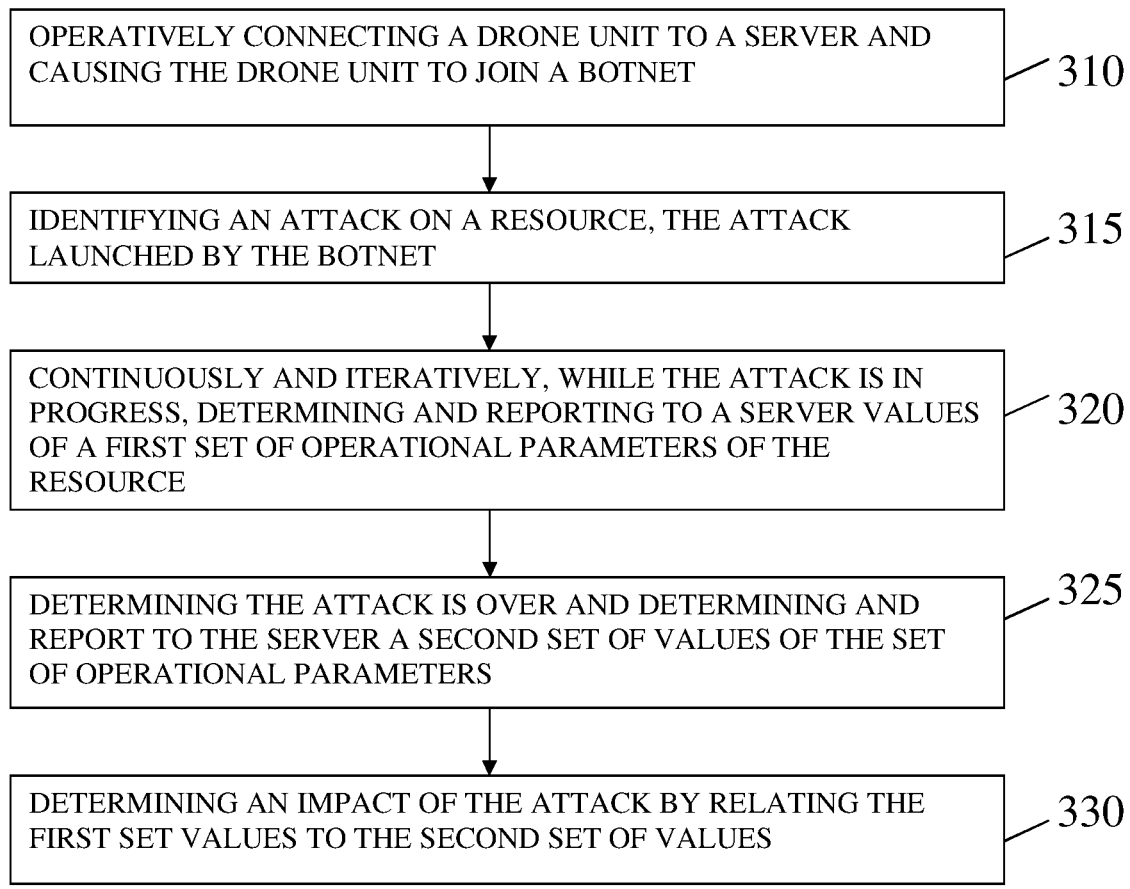
FIG. 3 shows a flowchart of a method according to illustrative embodiments of the present invention.

Reference is made to FIG. 3, a flowchart of a method according to illustrative embodiments of the present invention. As shown by block 310, a drone unit may be operatively connected to a server and may be caused to join a botnet. For example, drone unit 210 may be operatively connected to server 220, e.g., drone unit 210 and server 220 may be connected to network 240 and may thus operate as a system as described. Causing drone unit 210 to join a botnet may be done, for example, by executable code in drone unit 210 that, when executed by a controller in drone unit 210, causes the controller to join botnet 250.

For example, drone unit 210 may receive, from server 220, a set of configuration parameters or values and use them for joining botnet 250. For example, details of a protocol that include a TCP port number and a description or definition of a sequence of messages may be provided to drone unit 210 and drone unit 210 may use the protocol in order to join botnet 220, e.g., perform a set of actions that need to be taken in order to be authenticated by, and participate in, botnet 250. For example, using information received as described, drone 210 may connect to a specific TCP port at a specific IP address, listen for a specific string or message and send, or respond with, a specific string or message based on messages received (e.g., establish a connection or session as known in the art). For example, using credentials and/or other information received from server 220, drone unit 210 may join a botnet by establishing a network connection with a controller or other member of a botnet and may thus receive messages sent over the botnet. For example, having joined a botnet by establishing a network connection with a controller or manager of a botnet, drone unit 210 may receive a message that indicates who to attack (e.g., an IP address of a website), how to attack (e.g., continuously and repeatedly attempt to download a specific large file) and when to attack (e.g., a specification of a date, hour, minute and second).

As shown by block 315, an attack launched by a botnet, on a resource, may be identified. For example, having joined botnet 250, drone unit 210 may be able to identify or determine that botnet 250 has launched an attack, is about to launch an attack or is scheduling an attack on resource 230 e.g., by receiving a command or message from botnet 250 instructing drone unit 210 to attack resource 230. An attack may be identified based on a message received, by drone unit 210, from a botnet, e.g., a message instructing drone unit 210 to attack a resource wherein the message may include an identification of the resource to be attacked (e.g., an IP address and port), a method of attack and a time to start the attack. As described, messages sent over a botnet may be commands or instructions that specify who, when and how to attack, and, accordingly, having joined a botnet, drone unit 210 may know what the botnet is doing, how it is doing it and when it is doing (or planning to do) it. For example, after joining a botnet as described, drone unit 210 may receive messages sent over the botnet and thus may know what the botnet does or is about to do. Drone unit 210 may join a botnet according to, or based on, a command or message received from server 220. For example, server 220 may provide drone unit 210 with an IP address and port usable for establishing a connection with a controller of a botnet. As known in the art, a botnet launches an attack by instructing a plurality of clients (or zombies as known in the art) to attack a target, accordingly, having joined botnet 250 and acting as one of its clients or zombies, drone unit 210 may readily identify or determine that botnet 250 is attacking resource 230.

For example, provided with data that enables it to interpret messages or traffic of botnet 250 (e.g., a communication protocol of botnet 250 provided by server 220) and by continuously listening to traffic related to botnet 250 (e.g., messages sent from a master unit in botnet 250), drone unit 210 may analyze traffic in or of botnet 250, and identify or determine when an attack on a specific target is launched. For example, having joined botnet 250 as described, drone unit 210 may receive, from a node in botnet 250, a command that identifies, specifies or indicates a target to be attacked, the type of attack to be launched, the time of the attack and the like. It will be understood that any information shared by nodes in botnet 250 as known in the art may be available to drone unit 210 after having joined botnet 250 as described.

As shown by block 320, values of a first set of operational parameters of the resource may be continuously, repeatedly and/or iteratively, while the attack is in progress, determined and reported to a server. For example, drone unit 210 may continuously, repeatedly and/or iteratively, while an attack launched by botnet 250 is in progress, determine operational values of resource 230 and provide the values to server 220. For example, drone unit 210 may, continuously, repeatedly and/or iteratively, while an attack is in progress, send, to resource 230, Internet Control Message Protocol (ICMP) echo or ping messages that, as known in the art, can be used to measure a response time of resource 230. By comparing the response time of resource 230 when it is under attack to the response time of resource 230 before the attack or after the attack, the impact of the attack may be determined, e.g., by server 220.

It will be noted that, although ping messages are mainly described herein, other operational values or measured may be used by embodiments of the invention. For example, throughput of resource 230 may be measured when resource 230 is under attack and compared to the throughput of resource 230 before the attack or after the attack is over. For example, throughput may be measured by downloading large files or content objects (e.g., movies or video clips), for example, drone unit 210 may record the speed with which a large file is downloaded from resource 230 during an attack and the speed may be compared to the speed with which a large file is downloaded from resource 230 after (or before) the attack.

In order to compare or relate operational values of an attacked resource to values as measured before the attack, operational values of the resource may be measured and recorded in advance, e.g., when ascertaining the resource is not under any attack. Accordingly, when a resource is under attack, operational values previously recorded may be used in order to immediately evaluate the impact of the attack. For example, server 220 may record the time it takes to establish a TCP connection with a network server (e.g., the time it takes to complete the three-way handshake as known in the art), as 100 milliseconds, and, subsequently, when the server is under attack, the time it takes to establish a TCP connection with the server may be measured, e.g., by drone unit 210, and, by comparing the two measured times, a severity of the attack may be produced. In other cases, typical or average times for completing tasks or responding to requests may be stored, e.g., the time to download a 5 megabyte (MB) size file or the time an LDAP server to respond to a query, and accordingly, by measuring the time it takes a resource to complete a task, when under attack, and by comparing the measured time to a typical or average known time, the severity of the attack may be deduced, calculated or quantified. In yet other embodiments or cases, measured times required by a resource to complete tasks when under attack may be compared to the times required for the same tasks when or after the attack is over. For example, when determining an attack is under way, drone unit 210 may request, or cause, the resource 230 to perform a set of tasks (e.g., open a network connection, download a file and so on), and drone unit 210 may record the time these tasks take, and when the attack is over (e.g., drone unit 210 determines the attack is over based on a message received from botnet 250), drone unit 210 may request, or cause, resource 230 to perform the same set of tasks and may record the time these tasks take when resource 230 operates normally. By comparing the times measured as described, an impact of an attack may be quantified, e.g., by dividing a time measured during an attack by a time measured under normal operation or by any other logic that may be applied to times measured as described.

As shown by block 325, a second set of values of the set of operational parameters may be determined after the attack is over, and the second set of values may be reported to a server. For example, after the attack is over, drone unit 210 may measure operational parameters such as a response time or throughput of a website and provide server 220 with values of the operational parameters. As described, drone unit 210 may be connected to botnet 250, and, accordingly, drone unit 210 may know when an attack is over. For example, as known in the art, botnet 250 may send, to its client (or zombies), a command instructing them to terminate an attack, and drone unit 210 may receive such command and determine that the attack is over. Upon determining that the attack is over (or any time thereafter), drone unit 210 may check operational values of a resource that was attacked and send the values to server 220 as described. For example, drone unit 210 may determine an attack is over based on a message received from a controller of botnet 250. As described, drone unit 210 may join botnet 250, and, accordingly, drone unit 210 may receive messages that instruct it to launch an attack and to terminate an attack. Accordingly, drone unit may determine an attack is about to begin, is ongoing and or determine an attack is over.

As shown by block 330, an impact of the attack may be determined by relating the first set values to the second set of values. For example, by comparing a response time of resource 230 as measured before or after an attack to the response time of resource 230 as measured while resource 230 is under attack, server 220 may determine an impact and/or severity of the attack. For example, if a base or reference response time of resource 230 measured after an attack is 1 second, and the response time of resource 230 measured during an attack is 2 seconds, then a severity or impact determined by server 220 may be 2; if the response time of resource 230 measured during an attack is 4, then a severity or impact determined by server 220 may be 4; and so on Similar logic may be applied to any other operational parameters values described herein. Accordingly, server 220 may provide an impact or severity measure for an attack in the form of a number or value. Of course, an impact or severity calculated and provided may include a number of values (e.g., one for response time and one for throughput) or an impact or severity may be calculated based on a plurality of values.

In some embodiments, values of the operational parameters may be checked, measured and/or determined (e.g., by drone unit 210 as described), using a random time interval. For example, drone unit 210 may use a random number generator as known in the art in order to determine or select a time (or a next time or an interval) for checking a response time of resource 230. In some embodiments, drone unit 210 may continuously, repeatedly and/or iteratively measure a response time according to a randomly selected interval. For example, immediately upon an attack on resource 230 starts, drone unit 210 may, continuously, repeatedly and/or iteratively, measure a response time of resource 230 (e.g., using an ICMP message to ping resource 230) by repeatedly sending ping messages to resource 230, e.g., every ½ second or according to a random interval. Drone unit 210 may continue checking or measuring the response time of resource 230 during the attack and after the attack ends. For example, drone unit 210 may send ping messages to resource 230 for five minutes after the attack ends, e.g., in order to determine the normal response time of resource 230. Generally, using random intervals between messages or actions as described may make it difficult, for any entity, to identify or detect drone unit 210, server 220 or other components of system 200. For example, botnet operators wishing to avoid interaction with drone unit 210 may attempt to identify drone unit 210 based on its behaviour, e.g., based on the type of messages it sends, the interval between messages and so on. Accordingly, by randomizing aspects of its operation (e.g., randomizing time intervals between checking a response time of resource 230), drone unit 210 may avoid being detected or identified by botnet 250.

In some embodiments, after the attack has terminated, drone unit 210 may repeatedly determine and send values of the operational parameters for a predefined time period. For example, a response time of a website may be measured for 10 minutes after an attack has finished. By continuing to check operational parameters values after an attack is over, an embodiment (e.g., server 220) may verify no effects of the attack remain (e.g., a response time is steady or constant and is at an expected value). Checking operational parameters values after an attack is over by continuing based on a predefined, preconfigured or provided time period, for example, server 220 may provide drone unit 210 with a time value indicating how long drone unit 210 is to check and report operational parameters values after an attack is over.

As known in the art, the effects of an attack on the attacked resource may change or vary according to the attack, e.g., an effect of a first type of attack may last longer, or be more severe, than an effect of a second type of attack. In other cases, the specific operational aspects of an attacked resource that are affected by an attack are according to the attack type. In some embodiments, drone unit 210 and or server 220 may identify the attack and/or its type, and any logic used for measuring an effect of an attack may be based on the attack type. For example, based on the attack type, drone unit 210 may decide how long, after the attack, to keep checking an attacked website. As described, monitoring servers or units may check a health or operational aspects of an attacked resource, and, according to some embodiments, monitoring servers may check a health or operational aspects of an attacked resource based on the attack type as described herein.

In some embodiments, drone unit 210 may be adapted to identify a resource being attacked and provide, to server 220, information identifying the resource. For example, a name of an attacked website, an IP address of an attacked resource and the like may be determined, provided or known to drone unit 210, and drone unit 210 may provide server 220 with such or other information. For example, a command or message received, by drone unit 210 from botnet 250, may include an IP address or other information identifying, or usable for, identifying, a resource that is to be attacked by botnet 250. For example, using an IP address, a website may be identified, e.g., the name of the website, a universal resource locator (URL) pointing to the website and the like may be determined as known in the art. Accordingly, drone unit 210 may identify resource 230 and provide, to server 220, information identifying resource 230.

In some embodiments, drone unit 210 may be adapted to identify a botnet and provide, to a server, information or intelligence related to the botnet. For example, information or intelligence obtained by drone unit 210 that may be used for identifying botnet 250 may be, or may include, IP addresses of computers in botnet 250, network ports used (e.g., TCP or User Datagram Protocol (UDP) ports), type of attacks the botnet launches and so on. Any information received or obtained by drone unit 210 from botnet 250 (e.g., in messages or commands as described) may be forwarded, by drone unit 210 to server 220. Drone unit 210 may process and/or analyze information received from botnet 250 in order to deduce, derive, identify or determine information or intelligence identifying and/or related to, botnet 250 and drone unit 210 may provide the information or intelligence to server 220.

For example, drone unit 210 may establish a session or connection with botnet 250, collect information related to the session or connection (e.g., time intervals between messages, content of messages and the like), terminate the session and then re-establish the session, reconnect to botnet 250 or create a new session with botnet 250. Accordingly, data relates to a set of connections opened or established with botnet 250 may be collected, compared or otherwise analyzed, e.g., in order to better identify or characterize botnet 250.

For example, to collect intelligence, drone unit 210 may iteratively connect to botnet 250, e.g., establish a TCP connection with a unit included in botnet 250, disconnect from botnet 250 and then reconnect to botnet 250. For example, drone unit 210 may repeatedly, connect to botnet 250, collect data for ten minutes and then disconnect from botnet 250. The time to keep a connection open before closing it and/or the time to wait before reconnecting may be set by server 220 and provided to drone unit 210 as described. Server 220 may analyse data related to a set of connections made by drone unit 210 as described, e.g., server 220 may compare data of a first connection and a second connection and identify a behavior or other aspects of botnet 250 based on differences or similarities between connections.

In some embodiments, drone unit 210 may be adapted to identify an attack, a botnet and/or a resource being attacked. For example, drone unit 210 (or another unit or module) may examine and identify at least one of: data sent to an attacked resource and data sent by, or from, the attacked resource. For example, since drone unit 210 may join botnet 250 as described, any data communicated over, or by, botnet 250 may be available to drone unit 210.

Values of operational parameters monitored, checked, determined or calculated as described herein may be, or may include, for example, a response time, a CPU load and network utilization. A response time may be measured for specific ports. For example, a monitoring server may ping to a first port of resource 230, record the time it takes resource 230 to respond, ping a second port and record the response time and so on. For example, if resource 230 responds to standard ICMP pings as known in the art the drone unit 220 or a monitoring server may send ICMP packets to resource 230 and record the response time it takes to get a response.

Various methods may be used in order to measure or determine a state of an attacked resource. For example, the time it takes resource 230 to establish a TCP connection (e.g., completer the SYN, SYN/ACK, ACK sequence known in the art and transfer at least one packet over a newly established TCP connection may be measured, compared to a known or average time and used in order to determine, characterize or quantify a severity of an attack. For example, by comparing the time it takes for a TCP connection to be established between drone unit 220 and resource 230 to an average or known time, the load or impact of an attack on resource 230 may be determined or quantified. For example, denoting the time it takes resource 230 to establish a TCP connection under normal conditions $T_0$ and denoting the time it takes resource 230 to establish a TCP connection when under attack $T_1$ a severity of an attack may be quantified or represented by $T_1/T_0$. Similarly, the time it takes to download files from resource 230 when under attack may be related to the download time after the attack.

Values of operational parameters monitored, checked, determined or calculated as described herein may be, or may include, a time for completing an action, command or request. For example, drone unit 210 may check or determine the time it takes (the response time) for resource 230 to open a communication port. For example, as known in the art, in order to establish a TCP connection between a source and destinations, ports in the source and destinations must be opened and a destination typically informs the source that its port is open and ready for communication. Accordingly, by requesting resource 230 to establish a TCP connection, drone unit 210 may measure the time it takes for resource 230, when under attack, to open a port, establish a connection etc. Time required by an attacked resource in order to perform or complete any other operation, request or command may be measured by drone unit 210 and may further be compared to the time for performing the operation, request or command when an attack is over or before the attack began. Accordingly, an impact of an attack may be calculated based on any operation, request or command.

In another case, a system according to embodiments of the invention may use the ICMP protocol in order to identify the impact of an attack over time. For example, a monitoring server may use ICMP packets to ping a resource and measure and/or record the times (and their differences) taken by the resource to respond to pings. For example, a monitoring server may ping resource 230 (e.g., using ICMP echo messages as known in the art) before an attack begins, during the attack and after the attack ends. Times measured for pings as described may enable, and may be used by, system 200 in order to characterise or even quantify an attack, e.g., assign an attack with a severity score based on a decrease in response time for pings.

Although a single drone unit 210 is shown in FIG. 2 and described herein, it will be understood that any number of drone units 210 or monitoring servers or monitoring units may be included in a system and method according to some embodiments of the invention. A monitoring server or unit as referred to herein may be any computer, module or unit adapted to perform operations and logic as described with respect to drone unit 210.

In some embodiments, a plurality of monitoring servers (or a plurality of drone units 210) may be located in a respective plurality of geographic locations, e.g., different cities, states or continents and the plurality of monitoring servers may each continuously, repeatedly and/or iteratively, while an attack on resource 230 is in progress, determine and report to server 220 a first set of values of a respective set of operational parameters related to resource 230, e.g., the plurality of monitoring servers may operate and/or function the same way drone unit 210 operates and functions, during an attack, as described herein. Accordingly, measuring the operational state or level, measuring the capacity and/or availability of a resource, when under attack, may be done using a plurality of monitoring servers or drone units 210. Using a plurality of monitoring servers as described may make it difficult, e.g., for an operator of botnet 250, to identify or detect that an attacked resource is being monitored. For example, the monitoring server that actually monitors an attacked resource may be randomly selected, from a set of monitoring servers. In some embodiments, server 220 may cause a first monitoring server to monitor an attacked resource for a first time interval, cause a second monitoring server to monitor the attacked resource for a second time interval, and so on, such that identifying if and/or who is monitoring an attacked resource may be difficult or impossible.

In some embodiments, a plurality of monitoring servers drone units 210 as described herein may determine, and report to server 220, a second set of values of the set of operational parameters, the second set determined after the attack is terminated. For example, the plurality of monitoring servers drone units 210 may continue checking, determining and quantifying a response time or other measures of resource 230 after an attack launched by botnet 250 has finished, e.g., continuously, repeatedly, iteratively and/or based on a random or other interval, as described with respect to drone unit 210.

Server 220 may correlate or match values of the operational parameters with time and may present, to a user, a time-based progression of an attack. For example, each of one or more of: a response time, a CPU load, a network bandwidth and a throughput of resource 230 may be continuously, repeatedly, iteratively and/or periodically determined, in real-time and as an attack progresses, by one or more drone units 210 (or by a plurality of monitoring servers as described) and the real-time values or measures of operational parameters (e.g., a response time, a CPU load, a network bandwidth and a throughput) may be provided to server 220. Server 220 may use real-time values in order to provide or present real-time values to a user. For example, server 220 may graphically or numerically present and update, on a screen or monitor, values such as a response time of resource 230 while resource 230 is under attack. For example, a first curve or graph graphically showing a CPU load of resource 230, while resource 230 is under attack, may be drawn on a screen or monitor of server 220, a second curve or graph graphically showing a throughput of resource 230, while resource 230 is under the attack, may be shown and so on.

Server 220 may characterize an attack based on information stored in storage system 225. For example, server 220 may store values or other data related to a plurality of attacks and may use the stored data in order to characterize an attack, e.g., based on relating information received from drone unit 210 to the stored values or data. Such values, and other data discussed herein, may represent physical devices and real-world effects. For example, a response time data item stored may represent the activity of a real-world physical device such as a storage device, router, personal computer, etc. Generally, server 220 may store any data received from drone unit 210 as described herein. For example, information related to an attack such as port numbers, webpages requested, files downloaded, IP addresses of botnet components or computers and so on may be stored in storage system 225. Accordingly, using information received from drone unit 210, (e.g., when an attack is identified and reported, to server 220 by) drone unit 210 as described), server 220 may identify the attack, e.g., by finding in database 225 information related to similar attacks and or information related to an attack by botnet 250.

Advantages of characterizing an attack may be appreciated by a person skilled in the art, for example, having identified an attack, server 220 may predict which specific assets of an attacked resource are likely to be attacked. For example, based on information in database 225, server 220 may predict that an attack by botnet 250 will include trying to connect to specific ports, requesting specific webpages or use specific protocols. Characterizing an attack enables server 220 to provide suggestions to a user and or to automatically apply counter measures. For example, having characterized an attack and predicting elements of the attack, server 220 may suggest to a user to configure a firewall such that specific ports are blocked. In other cases, a suggestion provided by server 220 may include blocking access to specific files (e.g., large files known to be downloaded by botnet 250). In some embodiments, server 220 may automatically configure/modify an attacked website (e.g., resource 230) based on characterising an attack as described. For example, having detected that botnet 250 is attacking resource 230 or a network by sending messages to a specific TCP port (e.g., sending SYN messages to a specific TCP port as known in the art), server 220 may configure a firewall that protects resource 230 to block the specific port. Accordingly, a system and method according to some embodiments of the invention may, in real-time, characterize an attack and protect an attacked resource from the attack. In other examples, e.g., if server 220 determines that an attack includes downloading, from resource 230, a large file (e.g., in an attempt to exhaust network capacity of resource 230), server 220 may configure resource 230 to (possibly temporarily) deny requests for downloading the large file. In other examples, dummy files may be created (e.g., zero size files) such that download requests do not really burden a resource.

As described herein, embodiments of the invention address the Internet-centric and computer-centric challenges of alerting, evaluating and/or combating botnet attacks. It is noted that some embodiments of the invention may not only monitor an attack but may additionally evaluate the attack, quantify the attack (e.g., by providing a measure of impact as described) and enable combating, or mitigating an effect of, attacks (e.g., by presenting real-time progress of an attack, providing suggestions and so on.

Some embodiments of the invention not only manipulate data but generate information and data, e.g., calculate and provide or present numeric values for an impact of an attack, e.g., a severity score of an attack determined based on a comparing a response time of a resource during normal operation to the response time of a resource when attacked.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system for evaluating an impact of a distributed denial of service (DDoS) attack, the system comprising a server, and a drone unit operatively connected to the server, and wherein the drone unit comprises a processor and a memory including instructions, by which the drone unit is adapted to:
   join a botnet, by establishing a network connection with a botnet member;
   receive over the network connection, from the botnet member, one or more botnet messages with DDoS attack details, wherein the DDoS attack details include a target resource, a start time of a DDoS attack and a stop time of the DDoS attack;
   repeatedly after the start time, determine, and report to the server, a first set of values of a respective set of operational parameters related to the target resource; and,
   subsequently, determine, and report to the server, a second set of values of the set of operational parameters, the second set determined after the stop time;
   and wherein the server comprises a processor and a memory including instructions, by which the server is adapted to determine an impact of the DDoS attack by relating the first set values to the second set of values.

2. The system of claim 1, further comprising determining and reporting the first set of values at random time intervals, and determining and reporting the second set of values for a predefined time period.

3. The system of claim 1, wherein the drone unit is further adapted to provide to the server information included in the one or more botnet messages identifying the target resource.

4. The system of claim 1, wherein the drone unit is further adapted to identify the botnet member and to provide, to the server, information included in the one or more botnet messages regarding the botnet member.

5. The system of claim 1, wherein the operational parameters include at least two of: a response time, a CPU load, an open communication port response time measure and a network utilization.

6. The system of claim 1, wherein at least some of the operational parameters values are measured by a response time of a remotely available service.

7. The system of claim 6, wherein the response time is repeatedly measured according to a randomly selected interval.

8. The system of claim 1, wherein determining, and reporting to the server, the first set of values, is terminated after a predetermined attack period.

9. The system of claim 1, comprising a plurality of monitoring servers located in a respective plurality of geographic locations, wherein each of the monitoring servers comprises a processor and a memory including instructions, by which the monitoring server is adapted to:
   iteratively, after the start time, determine and report to the server a third set of values of a respective set of operational parameters related to the target resource; and
   determine, and report to the server, a fourth set of values of the set of operational parameters, the fourth set determined after the DDoS attack is terminated.

10. The system of claim 1, wherein relating the first set of values to the second set of values comprises correlating the operational parameters with time and presenting, to a user, a time-based progression of the attack.

11. The system of claim 1, wherein the server is further adapted to characterize the DDoS attack by comparing information received from the drone to stored information of similar DDoS attacks.

12. A method of evaluating an impact of a distributed denial of service (DDoS) attack, the method implemented by a server and a drone unit, each having a processor and a memory including instructions to perform respective steps of the method, wherein steps of the method performed by the drone unit comprise:
   joining a botnet, by establishing a network connection with a botnet member;
   receiving over the network connection from the botnet member one or more botnet messages with DDoS attack details, wherein the DDoS attack details include a target resource, a start time of a DDoS attack and a stop time of the DDoS attack,
   repeatedly, after the start time, determining, and reporting to the server, a first set of values of a respective set of operational parameters related to the resource, and,
   determining, and reporting to the server, a second set of values of the set of operational parameters after the stop time; and
   wherein steps of the method performed by the server comprise determining an impact of the DDoS attack by relating the first set values to the second set of values.

13. The method of claim 12, further comprising determining and reporting the first set of values at random time intervals, and determining and reporting the second set of values for a predefined time period.

14. The method of claim 12, further comprising sending from the drone unit, to the server, information included in the one or more botnet messages identifying the target resource.

15. The method of claim 12, further comprising sending from the drone unit, to the server, information included in the one or more botnet messages regarding the botnet.

16. The method of claim 12, wherein the operational parameters include at least two of: a response time, a CPU load, an open communication port response time measure and a network utilization.

17. The method of claim 12, wherein at least some of the operational parameters values are measured by a response time of a remotely available service, and wherein the response time is repeatedly measured according to a randomly selected interval.

18. The method of claim 12, wherein
   determining the first set of values comprises measuring a first amount of time required for the target resource to complete a task,
   determining the second set of values comprises measuring a subsequent amount of time required for the target resource to complete the same task after the stop time, and
   determining an impact of the DDoS attack comprises quantifying, by the server, an impact of the DDoS attack by dividing the first amount of time by the subsequent amount of time.

* * * * *